3,361,665
METAL PHOSPHATE THICKENING AGENT AND COMPOSITIONS CONTAINING SUCH
Kurt Tesche, Lovenich, near Cologne, Karl Geiersberger, Cologne-Deutz, and Wolfgang Lampe, Marburg an der Lahn, Germany, assignors to Chemische Fabrik Kalk, G.m.b.H., Cologne-Kalk, Germany, a corporation of Germany
No Drawing. Filed June 27, 1966, Ser. No. 561,683
7 Claims. (Cl. 252—25)

This application is a continuation-in-part of U.S. application Ser. No. 306,269, filed Sept. 3, 1963, now abandoned.

This invention relates to mixtures of liquids or of soft or pasty compositions with finely divided substances.

As is known, liquids or soft or pasty compositions can be thickened to the point of solidification by mixing with finely divided oxides of metals or metalloids. Particularly suitable for this purpose is a highly dispersed silicon dioxide, having a particle size between 0.004 and 0.02$\mu$ and a surface of 174 to 400 m.$^2$/g. It is added to the liquids or to the soft or pasty compositions in quantities from 1 to 20% by weight. This highly dispersed silicon dioxide, however, has the disadvantage that it readily forms lumps on being incorporated by stirring into liquids and these lumps are only removed by further stirring with very great difficulty. In addition, this highly dispersed silicon dioxide is hydrated very quickly in water-containing liquids or soft or pasty compositions. On account of these properties, for example, for thickening aqueous synthetic plastic dispersions, without preliminary treatment since it extracts so much water by the hydration from the dispersions that the dispersed phase coagulates.

Accordingly, an attempt has been made to find other finely divided substances which can be used without the aforementioned disadvantages as a thickening agent for liquids or soft or pasty compositions.

Mixtures of liquids or soft or pasty compositions with finely divided substances have now been discovered which do not present these disadvantages. These mixtures consist of 1 to 50% by weight, advantageously 3 to 10% by weight, of finely divided phosphates which are difficultly soluble in water and are present mainly in the ortho-form, which phosphates have in the primary structure average particle sizes below 0.03$\mu$, advantageously from 0.05 to 0.02$\mu$. For simplifying the description, these phosphates are hereinafter referred to as "finely divided phosphates."

In the finely divided phosphates, divalent metals or aluminum or mixtures thereof should be present as cationic constituents in such quantities that the MeO:P$_2$O$_5$ or the Me$_2$O$_3$:P$_2$O$_5$ molar ratio in the finely divided phosphates is 0.6 to 3.5. In order to obtain the finely divided phosphates it is preferred initially to mix together phosphoric acid and salts which contain divalent metals or aluminum or mixtures thereof as cation and the anionic radical of a strong volatile acid as anion in suitable proportions to form a clear solution or a paste. These mixtures are then sprayed into an inert hot gas stream, which is at temperatures of 190 to 450° C. The finely divided phosphates which are formed as end product are predominantly in ortho-form and their bulk weight is between 5 and 350 g./1, advantageously between 8 and 80 g./1. Their average particle size in the primary structure is below 0.03$\mu$. The primary particles of these finely divided phosphates can also be agglomerated to form loose and porous compounds (secondary structure). The development and the form of these secondary structures depend essentially on the chemical composition of the corresponding finely divided phosphate and also on the starting materials used for the production thereof and the conditions which are maintained during production. Thus, the primary particles with a size of about 0.01$\mu$ and consisting of tricalcium phosphate produced from phosphoric acid and calcium nitrate form loose, porous balls with a diameter of 0.05 to 3.0$\mu$ diameter or elongated elements with a length of about 3.0$\mu$, which are constructed in a manner similar to a string of pearls. In products formed by spraying calcium chloride and phosphoric acid, the primary particles with a size of about 0.01$\mu$ are arranged as porous rods or cords with a length of 1 to 5$\mu$.

One may also employ finely divided phosphates which have been produced by other processes as constituents of the mixture. The most desirable thickening action for liquids or soft or pasty masses is only obtained, however, if these finely divided phosphates in the primary structure have an average particles size below 0.03$\mu$ and bulk weights from 5 to 350 g./l., advantageously 8 to 80 g./l.

Before being mixed with the liquids or the soft or pasty masses, the finely divided phosphates can also be mixed with other finely divided substances, of which the particles are larger than those of the finely divided phosphates. For the production of such mixtures, it is of course only possible to employ substances which do not react chemically with the finely divided phosphates. Such mixtures have the same thickening action on liquids or on soft or pasty masses as the finely divided phosphate itself, which is contained in these mixtures.

As second component, the mixtures according to the invention contain liquids, as for example pure substances which are liquid at normal temperature, or mixtures thereof, oils, solutions, dispersions, emulsions or the like, or soft or pasty masses, such as for example paraffins, fats, waxes, pastes, bitumen, tar, asphalt and the like. These liquids or soft or pasty masses should not react chemically with the finely divided phosphates.

The viscosity of liquids can be increased until solid masses are formed if the finely divided phosphates are slowly incorporated by stirring into the liquid. Since the finely divided phosphates have a substantially lower affinity for water than for example highly dispersed silicon dioxide, the finely divided phosphates can in this way be mixed without lump formation with water or liquids which contain water. Thus, gel-like mixtures are for example formed if 5 to 20% by weight of a finely divided phosphate are slowly incorporated by stirring into aqueous solutions or suspensions of inorganic substances, such as for example potassium carbonate solution or calcium hydroxide suspensions. In this manner also, electrolyte solutions can also be so thickened by adding 15% by weight of a finely divided zinc phosphate that they can be used as filling in pocket lamp batteries as an electrolyte composition. It is also possible for organic liquids, as for example benzene, chlorobenzene, p-dichlorobenzene, toluene, formaldehyde and the like to be solidified into stiff pastes by incorporating slowly by stirring 1 to 10% by weight of a finely divided phosphate. Aqueous sodium silicate solutions (water glass) solidify immediately into a hard solid mass after adding 6% by weight of a finely divided phosphate. Aqueous dispersions and emulsions, such as for example synthetic plastic dispersions, can be solidified by slowly stirring in about 5% by weight of a finely divided phosphate without the dispersed or emulsified phase coagulating. Furthermore, solid, gel-like pastes can be produced from oils of very different origins by slowly stirring in about 10 to 20% by weight of finely divided phosphates. Soap solutions which per se tend to form filaments after standing for a short time can be transformed into a non-stringy paste by slowly stirring in about 17% by weight of a finely divided phosphate, which paste can be pressed into tablets.

The addition of smaller quantities of finely divided phosphates causes at least a thickening of the liquid concerned. Thus, lacquers and paints which contain a quantity of finely divided phosphates insufficient for gellation can for example be brushed on without forming filaments and without dripping. Because of their fine consistency and their structure, the finely divided phosphates are also excellent delustering agents for lacquers and paints. The finely divided phosphates which are sparingly soluble in water generally act as dispersion auxiliaries. They prevent a sedimentation of the dispersed phase and with dispersed substances of particularly high specific gravity, facilitate a redispersion of the sediment by stirring. Small quantities of a finely divided phosphate reduce the tendency of adhesives to form filaments and increase the setting strength thereof.

The finely divided phosphates, more especially finely divided calcium phosphates, can be used with particular advantage as thickening agents and dispersion auxiliaries in foods and the like, cosmetic or pharmaceutical preparations, such as for example liquids, ointments, pastes or jellies. As compared with other fillers, such as highly dispersed silicon dioxide, the finely divided calcium phosphates have the advantage that they contain elements, namely calcium and phosphorus which are necessary for the nourishment of the human or animal body. The extraordinarily fine distribution of these phosphates facilitates their capacity for being resorbed by the human or animal body. The fineness and the structure of the finely divided calcium phosphates which are incorporated for thickening purposes into toothpaste also produce a good polishing effect.

The finely divided phosphates may be incorporated by kneading at normal temperature into soft compositions, as for example pastes, paraffins, fats, waxes, tar, bitumen and the like. The phosphates may also be incorporated by heating these substances above their softening point and incorporating the phosphate slowly by stirring. The finely divided phosphates produces an increase in the dropping point of these substances.

Before being mixed with liquids or soft or pasty compositions, the finely divided phosphates can also be impregnated with active substances of all types, such as for example insecticides, fungicides and the like. For this purpose, the finely divided phosphates are initially impregnated with a suspension or solution of these active substances and the suspension agent or solvent is evaporated from these mixtures. Readily volatile liquids are advantageously used for producing the active substance suspension or solution. It is also possible for the active substances to be sprayed in the form of liquids, as for example solutions, melts and the like, onto the finely divided phosphates.

Solid products are obtained if the liquids or liquefied soft or pasty compositions are sprayed onto the finely divided phosphates, advantageously by whirling in a fluidizing chamber for this purpose and the liquid or the liquefied soft or pasty compositions are sprayed into the said chamber. By this means, it is possible to produce solid mixtures which are capable of trickling and which contain up to 70% by weight of liquid. Despite their high liquid content, these mixtures can be stored for a practically unlimited period without the individual particles sticking or caking together. Generally speaking, the finely divided phosphates treated in this manner can still be wetted satisfactorily with water, even when the added substances are water-repellant.

The mixtures according to the invention have the advantage that they can be produced more simply than the mixtures which contain the highly dispersed silicon dioxide which readily forms lumps during processing, since the finely divided phosphates do not show any tendency to lump formation, even in the presence of liquids. In addition the finely divided phosphates are hydrated considerably more slowly than the highly dispersed silicon dioxide formerly used for thickening liquids. The thickening effect of the finely divided phosphates contained in the mixtures according to the invention depends only to an insignificant extent on temperature.

In order that the invention may be more fully understood, the following examples are given by way of illustration only:

EXAMPLE 1

In order to raise the dropping point, there were added to the substances indicated in the table increasing quantities of a finely divided calcium phosphate, the $CaO:P_2O_5$ molar ratio of which was 0.5:1. In order to prepare the calcium phosphate, an aqueous solution containing phosphoric acid and calcium nitrate in suitable molar proportions was sprayed into an air stream heated to 380°. The primary particles of the calcium phosphate produced in this way had a diameter of about $0.1\mu$. They had agglomerated to form loose porous balls with a diameter of about $0.1\mu$. The bulk weight of this product was 8 g./l.

| | Quantity of phosphate, percent by weight | Dropping point, ° C. |
|---|---|---|
| Engine oil | 5 | 81.5 |
| | 7.5 | 91 |
| | 10 | >160 |
| Diesel oil | 3 | >160 |
| | 0 | 81 |
| Stauffer grease | 10 | 85.5 |
| | 20 | 96 |
| | 30 | 117 |
| | 0 | 42 |
| Paraffin I | 3 | 112 |
| | 5 | >160 |
| | 0 | 55 |
| Paraffin II | 3 | 122 |
| | 5 | >160 |
| | 0 | 63 |
| Paraffin III | 2 | 90 |
| | 3 | >160 |
| | 0 | 82 |
| Carnauba wax | 5 | 87 |
| | 10 | >160 |
| | 0 | 104 |
| Tar | 2 | 126 |
| | 3 | >160 |

EXAMPLE 2

5 parts by weight of the finely divided phosphate used in Example 1 were slowly incorporated by stirring into 50 parts by weight of formaldehyde and a pasty mixture having a gel-like character was formed.

EXAMPLE 3

6 parts by weight of the finely divided phosphate used in Example 1 were incorporated by stirring into 100 parts by weight of glycerine and a thixotropic paste was formed.

EXAMPLE 4

3.5 parts by weight of a finely divided phosphate were slowly incorporated by stirring into 87 parts by weight of benzene. The finely divided phosphate was produced in accordance with the details given in Example 1, by spraying an aqueous solution which contained calcium chloride and phosphoric acid in the molar ratio 3.3:1. The primary particles of this finely divided phosphate had a diameter of $0.01\mu$. These primary particles had become agglomerated to form small porous rods with a length of about $1.0\mu$ and a diameter of 0.01 to $0.15\mu$. The mixture is a thixotropic paste.

EXAMPLE 5

In order to determine the dependence on temperature of the thickening action of the finely divided phosphates, the experiments described below were carried out.

The finely divided phosphates used in these experiments were prepared under the conditions indicated in Example 1 from aqueous solutions of phosphoric acid and calcium chloride or calcium nitrate. The composition of the spraying solution and the characteritic features of the sprayed products are apparent from the following Table I.

TABLE I

| Designation of phosphate | Initial solution | | | End product | | |
|---|---|---|---|---|---|---|
| | Ca-compound used | Molar ratio CaO/P$_2$O$_5$ | Diameter of primary particles in μ | Form of secondary particles | Length of secondary particles in μ | Diameter of secondary particles in μ |
| A | Ca(NO$_3$)$_2$ | 0.5:1 | 0.01 | Small balls | | 0.1 |
| B | Ca(NO$_3$)$_2$ | 3:1 | 0.01–0.02 | Strings of pearls | 3 | 0.01–0.02 |
| C | Ca(NO$_3$)$_2$ | 3.3:1 | 0.01–0.02 | Small balls | | 0.06–0.1 |
| D | CaCl$_2$ | 3:1 | 0.01 | Small rods | 5 | 0.01–0.2 |
| E | CaCl$_2$ | 3.3:1 | 0.01 | ...do... | 1 | 0.02–0.03 |

Table II sets out the quantities of the various phosphates referred to in Table I, which quantities have to be added to 100 ml. of the solvents indicated in Table II in order to obtain mixtures of equal consistency at the indicated temperatures.

TABLE II

| Solvent | Temperature | Quantity of phosphate in g./100 ml. of solvent | | | | |
|---|---|---|---|---|---|---|
| | | Phosphate A | Phosphate B | Phosphate C | Phosphate D | Phosphate E |
| Benzene | 20 | 1.9 | 3.7 | 12.5 | 3.5 | 3.5 |
| | 70 | 2.0 | 3.9 | 11.6 | 3.5 | 3.6 |
| Toluene | 20 | 2.8 | 3.8 | 11.6 | 3.5 | 3.9 |
| | 70 | 2.6 | 3.8 | 11.8 | 3.4 | 3.6 |
| Chlorobenzene | 20 | 2.4 | 4.4 | 11.6 | 3.7 | 3.9 |
| | 70 | 2.2 | 4.5 | 11.2 | 3.7 | 3.6 |

The results of these experiments show that the thickening effect of the finely divided phosphates is practically independent of the temperature.

EXAMPLE 6

A solution of 3 g. of aniseed extracts in 100 ml. of ether was added dropwise with slow stirring to 47 g. of a finely divided phosphate prepared in accordance with the details given in Example 1. The ether is removed from the mixture by heating for a brief period. A dry product with good trickling properties and capable of being satisfactorily proportioned was formed with the product having a bulk weight of 22 g./l.

EXAMPLE 7

315 parts by weight of phthalic acid dinonyl ester were sprayed onto 250 parts by weight of a finely divided phosphate prepared in accordance with the data of Example 1 and with thorough mixing. A freely trickling powder was formed which had a bulk weight of 350 g./l.

EXAMPLE 8

To a white-pigmented, air-drying lacquer were added a finely divided phosphate prepared in accordance with the details of Example 1 in the quantities indicated in the following table. The delustering effect of the various additions is also indicated in the table:

| Content of finely divided phosphate in percent in lacquer | Lacquer gloss in percent |
|---|---|
| 0 | 100 |
| 1 | 13 |
| 2 | 13 |
| 3 | 4 |

EXAMPLE 9

8 parts by weight of a finely divided phosphate prepared according to the data of Example 1 were slowly incorporated by stirring into 92 parts by weight of a mixture which contained 20 parts by weight of ammonium chloride, 10 parts by weight of zinc chloride and 62 parts by weight of water. A solid paste was formed which could be used as electrolyte filling for pocket lamp batteries. Even after being stored for several months, this paste did not show any tendency to crystallise.

What is claimed is:

1. A composition comprising a dispersion in a thickenable liquid of from about 1 to 50 percent by weight of a finely divided substantially water-insoluble phosphate obtained by spraying a salt of a metal selected from the group consisting of zinc, calcium and aluminum and acid with an acidic phosphorous compound in a hot gas stream, said phosphate being predominantly in the ortho form, having an average particle size of less than 0.03μ, said amount being sufficient to thicken said liquid to a predetermined consistency.

2. A composition as claimed in claim 1, wherein said finely divided substantially water-insoluble phosphate is present in an amount of about 3 to 10 percent.

3. A composition as claimed in claim 1, wherein said substantially water-insoluble phosphate has a particle size of 0.01 to 0.02μ.

4. A composition as claimed in claim 1, wherein said substantially water-insoluble phosphate has a bulk weight of 5 to 350 g./l.

5. A composition as claimed in claim 1, wherein said substantially water-insoluble phosphate has a bulk weight of 8 to 80 g./l.

6. A composition as claimed in claim 1, wherein said finely divided water-insoluble phosphate is at least one member selected from the group consisting of compounds of the formula MeO:P$_2$O$_5$ and Me$_2$O$_3$:P$_2$O$_5$, wherein Me represents a member selected from the group consisting of aluminum, zinc and calcium.

7. A composition as claimed in claim 6, wherein the molar ratio of MeO:P$_2$O$_5$ and Me$_2$O$_3$:P$_2$O$_5$ is 0.6 to 3.5.

References Cited

UNITED STATES PATENTS 2,629,691   2/1953   Peterson _____ 252—25
2,948,679   8/1960   Rees et al. _____ 252—28
3,117,085   1/1964   Rees et al. _____ 252—28

DANIEL E. WYMAN, *Primary Examiner.*

I. VAUGHN, *Assistant Examiner.*